(12) United States Patent
Gao

(10) Patent No.: US 10,322,668 B2
(45) Date of Patent: Jun. 18, 2019

(54) AUTOMATIC ALARM WARNING LAMP

(71) Applicant: Ningbo Kaishuo Lighting Technology Co., Ltd., Yuyao (CN)

(72) Inventor: Yanhua Gao, Yuyao (CN)

(73) Assignee: Ningbo Kaishuo Lighting Technology Co., Ltd., Yuyao (CN)

(*) Notice: Subject to any disclaimer, the term of this patent is extended or adjusted under 35 U.S.C. 154(b) by 0 days.

(21) Appl. No.: 15/942,642

(22) Filed: Apr. 2, 2018

(65) Prior Publication Data

US 2018/0345853 A1    Dec. 6, 2018

(30) Foreign Application Priority Data

Jun. 6, 2017  (CN) .......................... 2017 1 0418666

(51) Int. Cl.
| | |
|---|---|
| *B60Q 1/52* | (2006.01) |
| *G08B 5/36* | (2006.01) |
| *H05B 37/02* | (2006.01) |
| *B60Q 1/26* | (2006.01) |

(52) U.S. Cl.
CPC .............. *B60Q 1/52* (2013.01); *B60Q 1/2611* (2013.01); *G08B 5/36* (2013.01); *H05B 37/029* (2013.01); *H05B 37/0218* (2013.01); *H05B 37/0227* (2013.01); *Y02B 20/42* (2013.01)

(58) Field of Classification Search
CPC ..... G09F 13/22; G09F 2013/222; B60Q 7/00; B60Q 1/2611; B60Q 1/52; F21S 43/00; F21V 29/70; F21W 2107/00; F21W 2107/10; F21Y 2105/10; F21Y 2115/10
See application file for complete search history.

(56) References Cited

U.S. PATENT DOCUMENTS

| | | | |
|---|---|---|---|
| 2012/0201041 A1* | 8/2012 | Gergets ................ | B60Q 1/2611 362/493 |
| 2014/0369060 A1* | 12/2014 | Zhang ...................... | F21V 9/08 362/542 |

* cited by examiner

*Primary Examiner* — Orlando Bousono
*Assistant Examiner* — Anthony D Afrifa-Kyei
(74) *Attorney, Agent, or Firm* — McDonnell Boehnen Hulbert & Berghoff LLP

(57) ABSTRACT

An automatic alarm warning lamp includes a red LED component, a blue LED component, an L-rod mounting base, a warning lamp housing, and a reinforcing plate. The red and blue LED components are installed in the warning lamp housing; the L-rod mounting base is disposed on an outer side of the top of a police car for fixing the warning lamp housing to the outer side of the top of the police car; and the reinforcing plate is disposed on an inner side of the police car for reinforcing the fixation of the warning lamp housing. The warning lamp further includes a control component coupled to the red and blue LED components for controlling the light emission of the red LED component and the light emission of the blue LED component. This disclosure improves the automation level of the warning lamp used in the police car.

5 Claims, 1 Drawing Sheet

AUTOMATIC ALARM WARNING LAMP

FIELD OF INVENTION

The present disclosure relates to the field of warning lamp control, in particular to an automatic alarm warning lamp.

BACKGROUND OF INVENTION

1. Description of the Related Art

A warning lamp adopts red and blue colors mainly for the following reasons: 1. Red color is a primary color of the warm colors series with a warning effect, and blue color is a primary color of the cool colors series having a sharp contrast with the red color and capable of attracting more people's attention. 2. The red and blue colors have a strong light penetration at night. 3. The red color is eye-catching, and even color blind people can distinguish red and blue colors. 4. Psychologists have done a tolerance test about feeling, wherein hot water and cold water are used to form two water pipes respectively, and then the water pipes of the hot and cold water are tangled, and people can feel the coldness and hotness at the same time when they touch the tangled pipes by hands. It is found that people can tolerate cold and hot water pipes alone, but the tangled pipes bring great stimulation to sensory. Perhaps, this problem can be explained by psychological views, and the comparison of two sensory elements gives a big hint, and red and blue are exactly opposite colors. Similar to the color water and hot water, the red color is a primary color of the warm colors series with a warning effect, and blue is a primary color of the color colors series having a sharp contrast with the red color and capable of attracting more people's attention.

In general, a conventional warning lamp has a single function and fails to provide more auxiliary functions to police units or officers. For example, if a suspect with a suspect track shows up in the vicinity of a police car, the police officer still need a visual recognition and manually turn on the warning lamp. Obviously, the conventional warning lamp has a low automation level.

2. Summary of the Invention

It is a primary objective of the present disclosure to overcome the aforementioned drawbacks of the prior art by providing an automatic alarm warning lamp capable of performing a suspect track detection of images around the police car, and issuing a suspect alarm signal if it is confirmed that a suspect having a suspect track exists in the final filtered image, or else issuing a no-suspect signal; as well as automatically popping out the L-rod mounting base and turning on the light emission of the red LED component and the light emission of the blue LED component upon receiving the suspect alarm signal, and also for turning off the light emission of the red LED component and the light emission of the blue LED component when receiving the no-suspect signal To achieve the aforementioned and other objectives, the present disclosure provides an automatic alarm warning lamp comprising a red LED component, a blue LED component, an L-rod mounting base, a warning lamp housing, and a reinforcing plate, characterized in that the red LED component and the blue LED component are installed in the warning lamp housing, the L-rod mounting base is disposed on an outer side of the top of a police car for fixing the warning lamp housing to the outer side of the top of the police car, and the reinforcing plate is disposed on an inner side of the police car for reinforcing the fixation of the warning lamp housing.

Wherein, the warning lamp further comprises a control component coupled to the red LED component and the blue LED component for controlling the light emission of the red LED component and the light emission of the blue LED component.

The automatic alarm warning lamp further comprises a timing device, for providing timing.

Wherein, the control element is coupled to the timing device for controlling the light emission of the red LED component and the light emission of the blue LED component according to the timing.

In the automatic alarm warning lamp, the control element controls the light emission of the red LED component and the light emission of the blue LED component, so that both of the red LED component and the blue LED component emit lights alternately.

The automatic alarm warning lamp further comprises:

an electric press-button installed in a front dashboard of the police car for sending an automatic fold-up signal and an automatic pop-out signal to the control element alternately under a user's operation;

a panoramic camera, installed at the top of the police car, for collecting image data of surrounding scenes of the police car to obtain a panoramic high definition image;

a first filter device, coupled to the panoramic camera, for receiving a panoramic high definition image, while executing a wavelet filter processing, a Wiener filter processing, a median filter processing, and a Gaussian low pass filter processing of the panoramic high definition image at the same time to obtain a first filter image, a second filter image, a third filter image and a fourth filter image respectively, while performing a signal-to-noise analysis of the first filter image, the second filter image, the third filter image and the fourth filter image at the same time to obtain a first signal-to-noise ratio, a second signal-to-noise ratio, a third signal-to-noise ratio, and a fourth signal-to-noise ratio respectively, and select the maximum signal-to-noise ratio from the four signal-to-noise ratios as a target signal-to-noise ratio, and use a filter image corresponding to the target signal-to-noise ratio as a target filter image;

an edge enhancement device, coupled to the first filter device, for performing an edge enhancement of the target filter image to obtain an edge enhancement image;

a noise analysis device, coupled to the edge enhancement device, for performing a noise component analysis of the edge enhancement image to obtain each noise type and each respective noise signal component of the edge enhancement image, and selecting three noise signal components with largest amplitudes from the noise signal components as a first noise signal component, a second noise signal component, and a third noise signal component according to a descending order of the amplitudes;

a second filter device, coupled to the edge enhancement device and the noise analysis device, for searching an image filter template corresponding to the first noise signal component, the second noise signal component, and the third noise signal component from an image filter template library as a first filter template, a second filter template, and a third filter template, and executing a filter processing of the edge enhancement image to obtain a final filtered image according to the first filter template, the second filter template, and the third filter template;

a track detection device, coupled to the second filter device, for performing a suspect track detection of the final filtered image, and issuing a suspect alarm signal if it is confirmed that a suspect having a suspect track exists in the final filtered image, or else issuing a no-suspect signal;

wherein, the control element is coupled to the track detection device for automatically popping out the L-rod mounting base and turning on the light emission of the red LED component and the light emission of the blue LED component after receiving the suspect alarm signal, and also for turning off the light emission of the red LED component and the light emission of the blue LED component when receiving the no-suspect signal;

wherein the step of the second filter device executing a filter processing of the edge enhancement image to obtain a final filtered image according to the first filter template, the second filter template, and the third filter template further comprises the steps of: using the first filter template to execute the filter processing of the edge enhancement image to obtain a first median filter image, and then using the second filter template to execute the filter processing of the first median filter image to obtain a second median filter image, and finally using the third filter template to execute the filter processing of the second median filter image to obtain a final filtered image; wherein the control element is coupled to the electric press-button and the L-rod mounting base, for automatically folding up the L-rod mounting base when receiving the automatic fold-up signal, and automatically popping out the L-rod mounting base when receiving the automatic pop-out signal; and the L-rod mounting base is a retractable mounting base.

In the automatic alarm warning lamp, the first filter device, the edge enhancement device, the noise analysis device, the second filter device and the track detection device are integrated into an integrated circuit board.

In the automatic alarm warning lamp, the first filter device, the edge enhancement device, the noise analysis device, the second filter device and the track detection device are disposed at different integrated circuit boards.

In the automatic alarm warning lamp, the first filter device, the edge enhancement device, the noise analysis device, the second filter device, and the track detection device are installed in a front dashboard of the police car.

The automatic alarm warning lamp further comprises: a brightness sensor, installed at the top of the police car and near the panoramic camera, for detecting an ambient brightness near the panoramic camera; and an auxiliary lighting source, disposed at the top of the police car and near the panoramic camera, and coupled to the brightness sensor, for receiving the ambient brightness, and providing an auxiliary lighting according to the ambient brightness for the image data collection of the panoramic camera.

DESCRIPTION OF THE PREFERRED EMBODIMENTS

The objectives, features, and advantages of the present disclosure are described and illustrated together with the related drawings as follows.

A warning lamp is extensively used as a warning sign in various different special places, and also applicable for signal contacts and direction instructions for municipal, construction, guardianship, emergency, and rescue workers. A general warning lamp is mainly used in police cars on duty for reminding other travelling cars or pedestrians to give way and provides a deterrent effect for arresting criminals and a sense of safety to the public, so as to avoid imminent wrongful acts.

A common warning lamp product generally has the following features.

High light energy efficiency: Ultra-high brightness solid-state maintenance-free LED is used as the light source to achieve the effects of providing a high light efficiency, a long life, and energy-saving and environmentally-friendly features. With an excellent core circuit design, two operation modes including a sound mode and a sound/light mode may be switched freely, and the alarm sound intensity is up to 115 decibels or higher, and the penetration ability is powerful, and thus a rechargeable battery such as a high-energy non-memory battery pack may be used, and such battery has the advantages of stable charge/discharge performance, high capacity, low self-discharge rate, and good energy saving and environmental protection effects. Advanced optical software and optimized structural seal design may be used, and the housing of the battery is made of an imported engineering plastic capable of withstanding strong collision and impact and ensuring a long-term stable operation of the lamp in a harsh environment. In addition, the lamp has the advantages of a convenient use, a small volume, a light weight, and an easy carry, and the lamp may be placed on a tabletop, hand-carried, or magnetically attached.

The hardware resource of the conventional warning lamp cannot be implemented into the prior art to recognize nearby suspects. In the meantime, the warning lamp is still turned on/off mainly in a manual fashion. To overcome the aforementioned deficiencies, this disclosure provides an automatic alarm warning lamp capable of solving the aforementioned technical problems.

Figure 1:
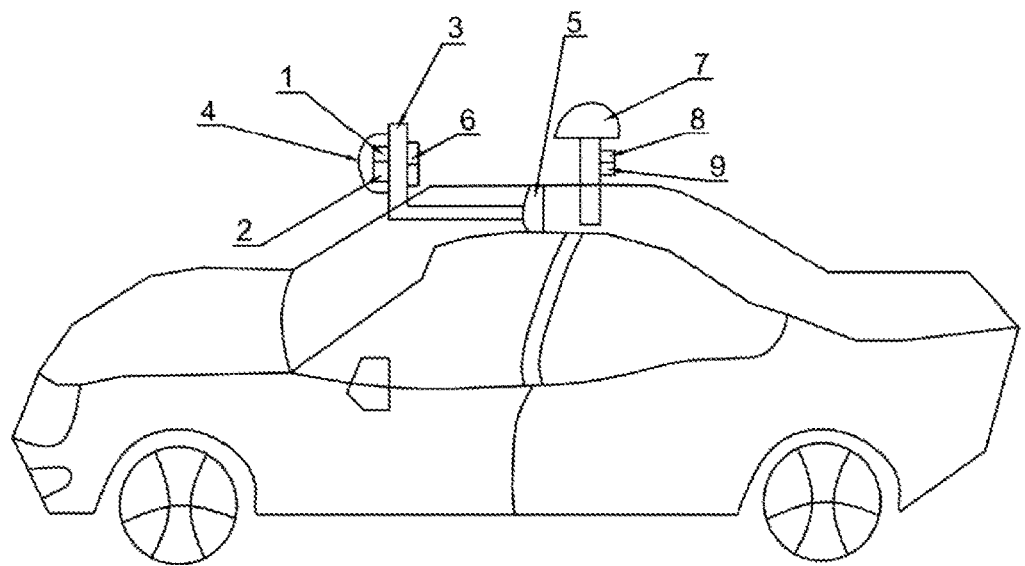
FIG. 1: Police car with warning lamp of this invention
1. a red LED component
2. a blue LED component
3. L-rod mounting base
4. a warning lamp housing
5. a reinforcing plate
6. a control component
7. a panoramic camera
8. a brightness sensor
9. an auxiliary lighting sources
Figure 2:
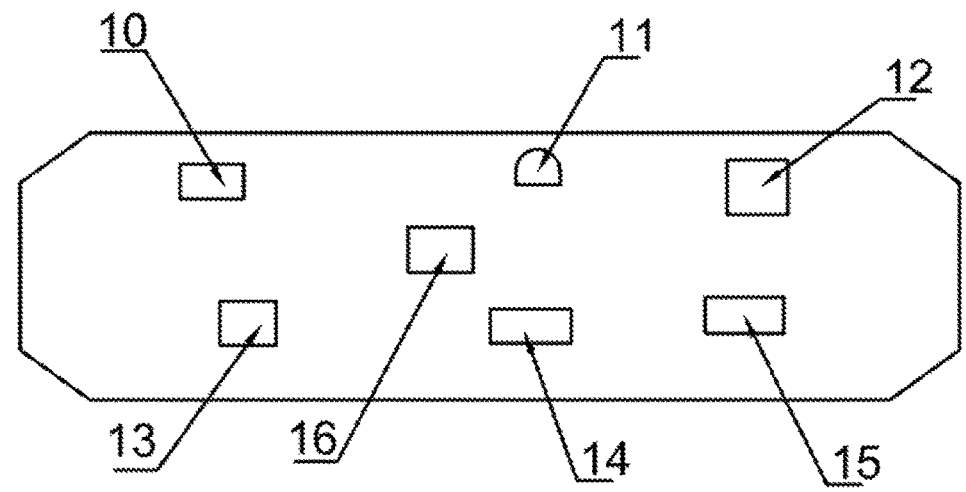
FIG. 2: Dashboard of police car
10. a timing device
11. an electric press-button
12. a first filter device
13. an edge enhancement device
14. a noise analysis device
15. a second filter device
16. a track detection device

With reference to FIG. 1 for a block diagram of the structure of an automatic alarm warning lamp in accordance with an embodiment of this disclosure, the lamp comprises a red LED component, a blue LED component, an L-rod mounting base, a warning lamp housing, and a reinforcing plate, characterized in that the red LED component and the blue LED component are installed in the warning lamp housing, and the L-rod mounting base is disposed on an outer side of the top of a police car for fixing the warning lamp housing to the outer side of the top of the police car, and the reinforcing plate is installed on an inner side of the top of the police car for reinforcing the fixation of the warning lamp housing.

Wherein, the warning lamp further comprises a control component coupled to the red LED component and the blue LED component for controlling the light emission of the red LED component and the light emission of the blue LED component.

The structure of the automatic alarm warning lamp of this disclosure will be described further below.

The automatic alarm warning lamp further comprises a timing device for providing timing.

Wherein, the control element is coupled to the timing device for controlling the light emission of the red LED component and the light emission of the blue LED component according to the timing.

In the automatic alarm warning lamp, the control element controls the light emission of the red LED component and the light emission of the blue LED component, so that both of the red LED component and the blue LED component emit lights alternately.

The automatic alarm warning lamp further comprises:

an electric press-button, installed in a front dashboard of the police car, for sending an automatic fold-up signal and an automatic pop-out signal to the control element alternately under a user's operation;

a panoramic camera, installed at the top of the police car, for collecting image data of surrounding scenes of the police car to obtain a panoramic high definition image;

a first filter device, coupled to the panoramic camera, for receiving a panoramic high definition image, while executing a wavelet filter processing, a Wiener filter processing, a median filter processing, and a Gaussian low pass filter processing of the panoramic high definition image at the same time to obtain a first filter image, a second filter image, a third filter image and a fourth filter image respectively, while performing a signal-to-noise analysis of the first filter image, the second filter image, the third filter image and the fourth filter image at the same time to obtain a first signal-to-noise ratio, a second signal-to-noise ratio, a third signal-to-noise ratio, and a fourth signal-to-noise ratio respectively, and select the maximum signal-to-noise ratio from the four signal-to-noise ratios as a target signal-to-noise ratio, and use a filter image corresponding to the target signal-to-noise ratio as a target filter image;

an edge enhancement device, coupled to the first filter device, for performing an edge enhancement of the target filter image to obtain an edge enhancement image;

a noise analysis device, coupled to the edge enhancement device, for performing a noise component analysis of the edge enhancement image to obtain each noise type and each respective noise signal component of the edge enhancement image, and selecting three noise signal components with largest amplitudes from the noise signal components as a first noise signal component, a second noise signal component, and a third noise signal component according to a descending order of the amplitudes;

a second filter device, coupled to the edge enhancement device and the noise analysis device, for searching an image filter template corresponding to the first noise signal component, the second noise signal component, and the third noise signal component from an image filter template library as a first filter template, a second filter template, and a third filter template, and executing a filter processing of the edge enhancement image to obtain a final filtered image according to the first filter template, the second filter template, and the third filter template;

a track detection device, coupled to the second filter device, for performing a suspect track detection of the final filtered image, and issuing a suspect alarm signal if it is confirmed that a suspect having a suspect track exists in the final filtered image, or else issuing a no-suspect signal;

wherein, the control element is coupled to the track detection device for automatically popping out the L-rod mounting base and turning on the light emission of the red LED component and the light emission of the blue LED component after receiving the suspect alarm signal, and also for turning off the light emission of the red LED component and the light emission of the blue LED component when receiving the no-suspect signal;

wherein the step of the second filter device executing a filter processing of the edge enhancement image to obtain a final filtered image according to the first filter template, the second filter template, and the third filter template further comprises the steps of: using the first filter template to execute the filter processing of the edge enhancement image to obtain a first median filter image, and then using the second filter template to execute the filter processing of the first median filter image to obtain a second median filter image, and finally using the third filter template to execute the filter processing of the second median filter image to obtain a final filtered image; wherein the control element is coupled to the electric press-button and the L-rod mounting base, for automatically folding up the L-rod mounting base when receiving the automatic fold-up signal, and automatically popping out the L-rod mounting base when receiving the automatic pop-out signal; and the L-rod mounting base is a retractable mounting base.

In the automatic alarm warning lamp, the first filter device, the edge enhancement device, the noise analysis device, the second filter device, and the track detection device are integrated into an integrated circuit board.

In the automatic alarm warning lamp, the first filter device, the edge enhancement device, the noise analysis device, the second filter device, and the track detection device are disposed at different integrated circuit boards respectively.

In the automatic alarm warning lamp, the first filter device, the edge enhancement device, the noise analysis device, the second filter device and the track detection device are installed in a front dashboard of the police car.

The automatic alarm warning lamp further comprises:

a brightness sensor, installed at the top of the police car and near the panoramic camera, for detecting an ambient brightness near the panoramic camera;

an auxiliary lighting source, disposed at the top of the police car and near the panoramic camera, and coupled to the brightness sensor, for receiving the ambient brightness, and providing an auxiliary lighting according to the ambient brightness for the image data collection of the panoramic camera.

Wherein, the panoramic camera may be a CMOS sensor. The CMOS image sensor is a typical solid-state imaging sensor sharing a common history with CCD. The CMOS image sensor generally comprises several components including an image-sensitive unit array, a row driver, a column driver, a timing control logic, an AD converter, a data bus output interface, a control interface integrated on the same chip, and the working process of the CMOS image sensor is generally divided into reset, photoelectric conversion, integration, and read.

The CMOS image sensor chip may be integrated with other digital signal processing circuits such as an AD converter, an automatic exposure controller, a non-uniform compensator, a white balance processor, a black level controller, a gamma corrector, etc. For a quick computation, a DSP device with a programming function may be integrated with the CMOS device to form a single-chip digital camera and an image processing system.

In 1963, Morrison announced a computable sensor, which is a structure for determining a spot location by a light guide effect, and becomes the beginning of the development of the CMOS image sensor. In 1995, a low-noise CMOS active-sensor single-chip digital camera was developed successfully.

The CMOS image sensor has the following advantages: 1. Random window reading ability: It gives a better function to the operation of the CMOS image sensor than the CCD, which is known as the area of interest selection. In addition, the highly integrated feature of the CMOS image sensor provides the function of opening several trace windows simultaneously. 2. Radiation resistance: Overall, the potential radiation resistance of the CMOS image sensor has a substantial improvement over the CCD performance. 3. System complexity and reliability: The use of CMOS image sensor simplifies the system hardware structure significantly. 4. Non-destructive readout of data. 5. Optimized exposure control: It is noteworthy that several functional transistors are integrated into the pixel structure, so that the CMOS image sensor has several drawbacks such as two indicators of noise and fill rate. In view of the relative superior performance of the CMOS image sensor, the CMOS image sensor can be used extensively in different areas.

The automatic alarm warning lamp of this disclosure aims at the technical problems of the conventional warning lamp unable to recognize nearby suspects and thus integrates a plurality of image recognition devices into the hardware resource of the present existing warning lamp and introduces the automatic fold-up mechanism to L-rod mounting base for folding up the warning lamp automatically and the automatic pop-out mechanism to show the warning lamp automatically, so as to overcome the aforementioned technical problems effectively.

Exemplary embodiments are illustrated in referenced figures of the drawings. It is intended that the embodiments and figures disclosed herein are to be considered illustrative rather than restrictive. Although the disclosure has been described by means of specific embodiments, numerous modifications and variations could be made thereto by those skilled in the art without departing from the scope and spirit of the disclosure set forth in the claims.

What is claimed is:

1. An automatic alarm warning lamp, comprising a red LED component, a blue LED component, an L-rod mounting base, a warning lamp housing, and a reinforcing plate, characterized in that the red LED component and the blue LED component are installed in the warning lamp housing, the L-rod mounting base is disposed on an outer side of the top of a police car for fixing the warning lamp housing to the outer side of the top of the police car, and the reinforcing plate is disposed on an inner side of the police car for reinforcing the fixation of the warning lamp housing, wherein the warning lamp further comprises a control component coupled to the red LED component and the blue LED component for controlling the light emission of the red LED component and a light emission of the blue LED component; wherein the automatic alarm warning lamp further comprises a timing device, for providing timing; wherein the control element is coupled to the timing device for controlling the light emission of the red LED component and the light emission of the blue LED component according to the timing; wherein the control element controls the light emission of the red LED component and the light emission of the blue LED component, so that both of the red LED component and the blue LED component emit lights alternately; wherein the automatic alarm warning lamp further comprises:

an electric press-button, installed in a front dashboard of the police car, for sending an automatic fold-up signal and an automatic pop-out signal to the control element alternately under a user's operation;

a panoramic camera, installed at the top of the police car, for collecting image data of surrounding scenes of the police car to obtain a panoramic high definition image;

a first filter device, coupled to the panoramic camera, for receiving a panoramic high definition image, while executing a wavelet filter processing, a Wiener filter processing, a median filter processing, and a Gaussian low pass filter processing of the panoramic high definition image at the same time to obtain a first filter image, a second filter image, a third filter image and a fourth filter image respectively, while performing a signal-to-noise analysis of the first filter image, the second filter image, the third filter image and the fourth filter image at the same time to obtain a first signal-to-noise ratio, a second signal-to-noise ratio, a third signal-to-noise ratio, and a fourth signal-to-noise ratio respectively, and select the maximum signal-to-noise ratio from the four signal-to-noise ratios as a target signal-to-noise ratio, and use a filter image corresponding to the target signal-to-noise ratio as a target filter image;

an edge enhancement device, coupled to the first filter device, for performing an edge enhancement of the target filter image to obtain an edge enhancement image;

a noise analysis device, coupled to the edge enhancement device, for performing a noise component analysis of the edge enhancement image to obtain each noise type and each respective noise signal component of the edge enhancement image, and selecting three noise signal components with largest amplitudes from the noise signal components as a first noise signal component, a second noise signal component, and a third noise signal component according to a descending order of the amplitudes;

a second filter device, coupled to the edge enhancement device and the noise analysis device, for searching an image filter template corresponding to the first noise signal component, the second noise signal component, and the third noise signal component from an image filter template library as a first filter template, a second filter template, and a third filter template, and executing a filter processing of the edge enhancement image to obtain a final filtered image according to the first filter template, the second filter template, and the third filter template;

a track detection device, coupled to the second filter device, for performing a suspect track detection of the final filtered image, and issuing a suspect alarm signal if it is confirmed that a suspect having a suspect track exists in the final filtered image, or else issuing a no-suspect signal;

wherein, the control element is coupled to the track detection device for automatically popping out the L-rod mounting base and turning on the light emission of the red LED component and the light emission of the blue LED component after receiving the suspect alarm signal, and also for turning off the light emission of the red LED component and the light emission of the blue LED component when receiving the no-suspect signal;

wherein the step of the second filter device executing a filter processing of the edge enhancement image to obtain a final filtered image according to the first filter template, the second filter template, and the third filter template further comprises the steps of: using the first filter template to execute the filter processing of the edge enhancement image to obtain a first median filter image, and then using the second filter template to execute the filter processing of the first median filter image to obtain a second median filter image, and finally using the third filter template to execute the filter processing of the second median filter image to obtain a final filtered image;

wherein the control element is coupled to the electric press-button and the L-rod mounting base, for automatically folding up the L-rod mounting base when receiving the automatic fold-up signal, and automatically popping out the L-rod mounting base when receiving the automatic pop-out signal; and the L-rod mounting base is a retractable mounting base.

2. The automatic alarm warning lamp of claim 1, wherein the first filter device, the edge enhancement device, the noise analysis device, the second filter device and the track detection device are integrated into an integrated circuit board.

3. The automatic alarm warning lamp of claim 1, wherein the first filter device, the edge enhancement device, the noise analysis device, the second filter device and the track detection device are disposed at different integrated circuit boards respectively.

4. The automatic alarm warning lamp of claim 1, wherein the first filter device, the edge enhancement device, the noise analysis device, the second filter device and the track detection device are installed in the front dashboard of the police car.

5. The automatic alarm warning lamp of any one of claims 2 to 4, further comprising:
   a brightness sensor, installed at the top of the police car and near the panoramic camera, for detecting an ambient brightness near the panoramic camera;
   an auxiliary lighting source, disposed at the top of the police car and near the panoramic camera, and coupled to the brightness sensor, for receiving the ambient brightness, and providing an auxiliary lighting according to the ambient brightness for the image data collection of the panoramic camera.

* * * * *